United States Patent
Buckingham et al.

(10) Patent No.: US 10,402,311 B2
(45) Date of Patent: Sep. 3, 2019

(54) CODE REVIEW REBASE DIFFING

(71) Applicant: Microsoft Technology Licensing, LLC, Redmond, WA (US)

(72) Inventors: Jason Buckingham, Kirkland, WA (US); Josue Leobardo Noriega de la Vega, Sammamish, WA (US); Fred Monteiro da Cruz Filho, Duvall, WA (US); Christopher James Antos, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 40 days.

(21) Appl. No.: 15/638,258

(22) Filed: Jun. 29, 2017

(65) Prior Publication Data

US 2019/0004925 A1    Jan. 3, 2019

(51) Int. Cl.
| | |
|---|---|
| *G06F 9/44* | (2018.01) |
| *G06F 11/36* | (2006.01) |
| *G06F 8/75* | (2018.01) |
| *G06F 8/71* | (2018.01) |
| *G06Q 10/10* | (2012.01) |

(52) U.S. Cl.
CPC .............. *G06F 11/368* (2013.01); *G06F 8/71* (2013.01); *G06F 8/75* (2013.01); *G06Q 10/101* (2013.01)

(58) Field of Classification Search
CPC ..... G06F 8/20; G06F 8/30; G06F 8/36; G06F 8/71; G06F 1/3684; G06F 11/3688; G06F 9/44589; G06F 9/44521
See application file for complete search history.

(56) References Cited

U.S. PATENT DOCUMENTS

| | | | |
|---|---|---|---|
| 8,627,280 B2 | 1/2014 | Roberts et al. | |
| 9,052,983 B2 | 6/2015 | Farchi et al. | |
| 9,201,646 B2 | 12/2015 | Balachandran | |
| 9,311,076 B2 | 4/2016 | Grillo et al. | |
| 9,430,229 B1* | 8/2016 | Van Zijst | G06F 9/3844 |
| 9,535,969 B1* | 1/2017 | Epstein | G06F 16/27 |
| 9,600,275 B2* | 3/2017 | Fan | G06F 8/73 |

(Continued)

FOREIGN PATENT DOCUMENTS

WO    2012079230 A1    6/2012

OTHER PUBLICATIONS

Fraser, Neil. "Differential synchronization." Proceedings of the 9th ACM symposium on Document engineering. ACM. (Year: 2009).*

(Continued)

*Primary Examiner* — Adam Lee

(57) ABSTRACT

Various embodiments of the present technology generally relate to smarter code review tools. More specifically, some embodiments relate to code review tools that include the ability to perform a "rebased" diff of code iterations. As a result, the code review tool has the ability to diff a file from a first iteration (e.g., iteration1) that was based on an initial base file (i.e., baseFile1), against updates from a second iteration (i.e., iteration2) that was based on an updated base file (i.e., baseFile2) without identifying the differences that occur between the initial base file and the updated base file. This allows a reviewer to view only the differences that the author of the code review made between successive iterations while filtering out or suppressing the extra noise that occurs because of updates to the base file.

20 Claims, 10 Drawing Sheets

(56) References Cited

U.S. PATENT DOCUMENTS

| | | | |
|---|---|---|---|
| 9,898,471 B1* | 2/2018 | Liu | G06F 17/30076 |
| 2006/0200793 A1* | 9/2006 | Duffy | G06F 1/12 |
| | | | 717/101 |
| 2009/0271768 A1 | 10/2009 | Goodson | |
| 2013/0332902 A1* | 12/2013 | Wang | G06F 8/38 |
| | | | 717/122 |
| 2014/0359602 A1* | 12/2014 | Sawaya | G06F 8/61 |
| | | | 717/176 |
| 2015/0331690 A1* | 11/2015 | Fan | G06F 8/71 |
| | | | 717/122 |
| 2016/0179505 A1* | 6/2016 | Grillo | G06F 8/70 |
| | | | 717/101 |
| 2016/0266896 A1* | 9/2016 | Fan | G06F 8/73 |
| 2017/0024366 A1 | 1/2017 | Saraya | |

OTHER PUBLICATIONS

Kindler, Ekkart, Patrick Könemann, and Ludger Unland. "Diff-based model synchronization in an industrial MDD process.". (Year: 2008).*

Bacchelli, et al., "Expectations, Outcomes, and Challenges of Modern Code Review", In Proceedings of the International Conference on Software Engineering, May 18, 2013, 10 pages.

"International Search Report and Written Opinion Issued in PCT Application No. PCT/US2018/034269", dated Sep. 3, 2018, 13 Pages.

* cited by examiner

CODE REVIEW REBASE DIFFING

BACKGROUND

Modern electronic devices such as computers, tablets, mobile phones, wearable devices and the like have become a common part of modern life. Many users of electronic devices routinely utilize various types of software applications for business and personal activities. Examples of software applications can include word processors, spreadsheet applications, e-mail clients, notetaking software, presentation applications, games, computational software, and others. These software applications can also be used to perform calculations, produce charts, organize data, receive and send e-mails, communicate in real-time with others, and the like. The software applications can range from simple software to very complex software.

The development of complex software is often performed by teams of software developers with designated roles. In many cases, code review is an iterative process where each line of code within the software is reviewed by one or more code reviewers apart from the author to ensure that the code will perform as expected. The code reviewers often comment on the current version of the code and request one or more changes. The comments on the current version of the code are communicated to one of the team members who makes additional changes before submitting the code for additional review.

In many cases, a diffing tool can be used to compare the changes that the developer has made to one or more files of the code. Typically, a code review compares the developer's version of the file (i.e., a iteration1) against the version of the file that is in the central repository (e.g., baseFile1). By identifying the changes to the code from the previous version, the next review can more easily confirm that the desired changes were made without having to reevaluate all of the code. However, with complex software products it is not uncommon for multiple developers to be working on the code at the same time. As such, just creating a straight diff of versions of the file may identify changes made by other developers. This can cause extra work for a reviewer that is not responsible for other portions of the code in trying to understand why a portion of code changed.

Overall, the examples herein of some prior or related systems and their associated limitations are intended to be illustrative and not exclusive. Upon reading the following, other limitations of existing or prior systems will become apparent to those of skill in the art.

OVERVIEW

Various embodiments of the present technology generally relate to systems and methods for facilitating code review. More specifically, some embodiments provide for systems and methods for implementing improved code features that can be used by individual authors and teams collaborating across multiple devices. For example, some embodiments allow multiple copies of a source document to be simultaneously edited by client devices. A developer can submit a first iteration that include one or more changes to a reviewer. In addition, in response to one of the client devices checking in an edited version of a second copy of the source document that has passed review, a new version of the source document can be created (e.g., in a local repository). The other client devices can synchronize the original copy the source document that they are editing to include changes made in the new version of the source document before addressing comments made by the reviewer on their previous edits.

The first iteration can be rebased with the new version of the source document and a diff can be created using the rebase of the first iteration with the new version of the source document. As such, a rebased iteration of the source document can be a new document that includes changes made by others for which the system considers the original version for purposes of comparison for future edits made by one user or developer. As such, a diff of the rebased version would identify the changes made by a developer while suppressing other edits present in the second baseline version. In some embodiments, the diff can suppress changes made in the new version of the source document, while in other embodiments different visual indicators (e.g., color codes, font style, font size, indentation, etc.) can be used to identify or minimize changes originating from synchronization of the first copy with the new version of the source document. In some embodiments, various data structures may be used to track and identify the source and time of the changes. As another example, the system may rebase the first iteration with the new version of the source document by using a virtual merge of the first iteration with the new version of the source document so that the changes are suppressed. Once a reviewer approves the code, a third version of the source document can be created.

Embodiments of the present technology also include computer-readable storage media containing sets of instructions to cause one or more processors to perform the methods, variations of the methods, and other operations described herein.

Some embodiments provide for a system having one or more processors, memory, a communication component, a storage module, a graphical user interface generation module, a review management module, a diffing tool, and/or other components. For example, in some embodiments, the communication component can allow the system to connect the code review platform to a first client device and a second client device. In some cases, each client device may be running a code review tool capable of accessing the first baseline version of the file (e.g., stored in a local repository). The communication component can receive edits to the first baseline version of the file made via the code review tool. In addition, the communication component can store, in the central repository, a second baseline version of the file that includes a second set of edits. The review management module can monitor the review of the edits to the first baseline version of the code, send reminders to reviewers and developers, and the like. In some embodiments, the communications component can transmit comments from the review of the edits to the first baseline version of the code to the developer. Subsequent changes to the first baseline version of the file can also be rebased, in response to a synchronization, against the second baseline file to identify changes.

The code review tool may include a graphical user interface that has multiple windows. In one of the windows comments created during the review of the edits of the first baseline version of the code can be presented. Other windows can include reviewer comments, review status and workflow, and the like. In addition, some embodiments allow reviewers to select between multiple versions of code diffs. For example, the multiple versions of the code diffs can include a rebased version that identifies the changes made by a developer while suppressing the second set of edits present in the second baseline version. Other versions of the code diff may include diffs based on the second baseline or successive iterations. The diffing tool can be used to create one or more of the diffs (e.g., a diff created using a rebased version of the edits to the first baseline version and the subsequent changes identifies changes made in the subsequent iterations).

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Embodiments of the present technology will be described and explained through the use of the accompanying drawings in which.

Figure 1:
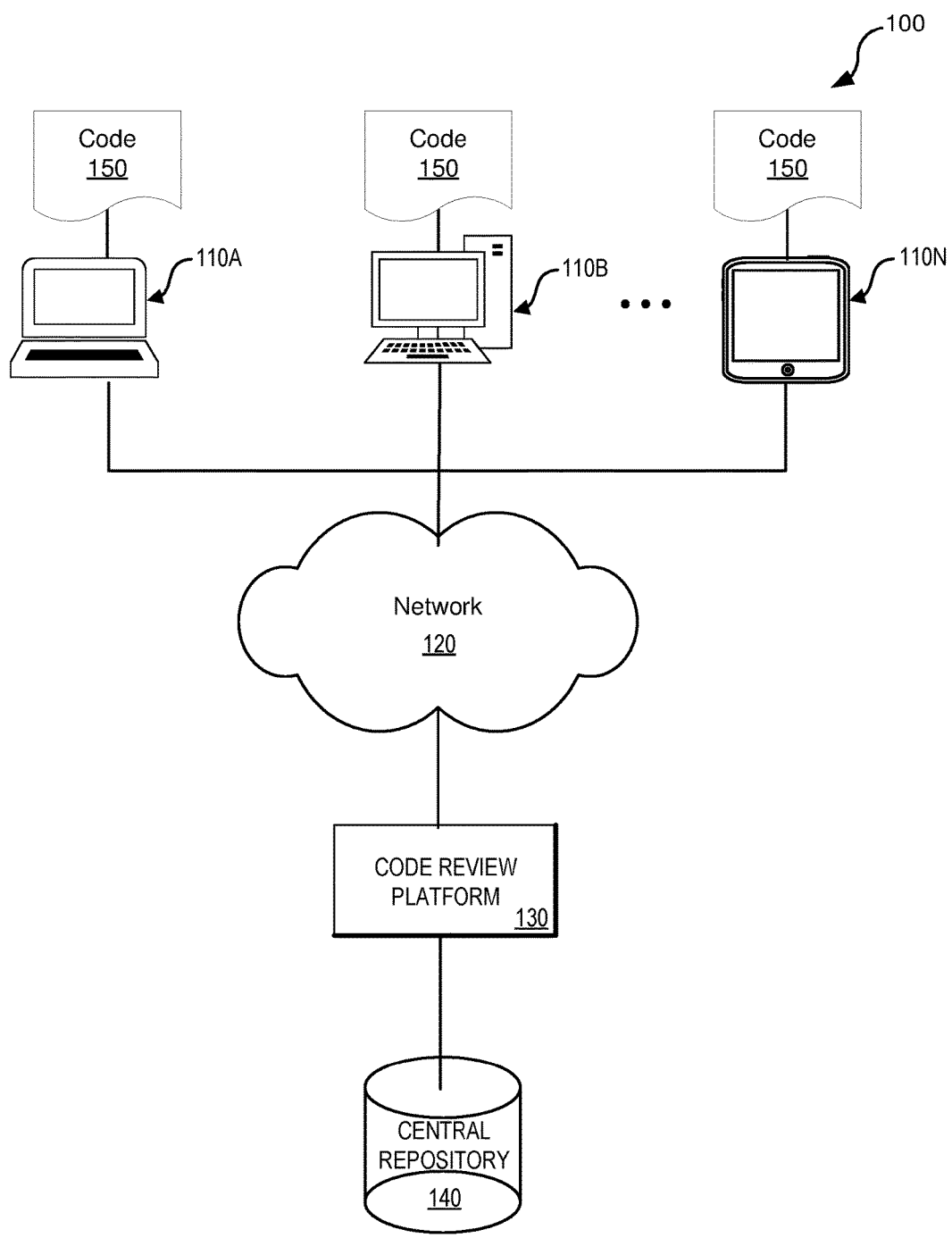
FIG. 1 illustrates an example of an environment capable of implementing a code review tool with rebase diffing in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems and methods for facilitating code review. More specifically, some embodiments provide for systems and methods for implementing improved code features that can be used by individual authors and teams collaborating across multiple devices. Developers around the world send code reviews to one another to identify their changes and give feedback to one another. A diffing tool is often used to compare the changes that the developer has made to one or more files of the code. Typically, a code review compares the developer's version of the file (iteration1) against the version of the file that is in the central repository (baseFile1).

However, developers frequently make updates to their own changes and send out an updated code review (i.e., iteration2). Reviewers who have already reviewed the first iteration (i.e., iteration1) of the changes frequently only want to see the updated changes since the first iteration. Instead of comparing the second iteration to the current base file, reviewers instead want to see the comparison between the second and first iteration (i.e., iteration2 against iteration1) resulting in just the updates between iterations rather than the updates compared to the base file.

In the basic case, viewing the updated changes between the second and first iteration (i.e., iteration2 and iteration1) of the code review is easy as the only changes present are from the developer making the changes. However, if the developer performed a "sync" with the current base file in the central repository in between the two iterations (i.e., iteration1 and iteration2), and if the base file was updated in the central repository (all of these are very common actions), identifying only the changes that the developer made themselves between the two iterations (i.e., iteration1) and iteration2) can be difficult because the second (i.e., iteration2) now also includes the extra changes from the central repository that are part of the updated base file (i.e., baseFile2). As a result, if a reviewer compares the second iteration (i.e., iteration2) against the first iteration (i.e., iteration1) hoping to only see the new updates that the developer made in second iteration, the reviewer will not only see the updates the developer made in the second iteration, they will also unfortunately see the changes that other developers made to the updated base file (i.e., baseFile2) which amounts to noise. Unfortunately, traditional tools do not allow a code reviewer to compare only the changes that the developer/author of the review made between successive iterations when a "sync" has occurred in between the iterations that resulted in the base file being updated.

In contrast, various embodiments of the present technology allow for a developer to review only the differences between success iterations of changes from the developer while filtering out or suppressing the noise that came from "syncing" with a new base file from a central repository that includes changes from other developers. Again, syncing is something that most developers do multiple times a week so that they always have the latest source code file versions from the central repository. Some embodiments perform a virtual merge of the changes from iteration one against the updated base file (i.e., baseFile2) such that iteration1 is "rebased" against the second (i.e., iteration2) baseline. As a result, when the tool creates a diff of subsequent iterations (e.g., iteration1) against iteration2), both files in the diffing tool now behave as if they were against the same baseline, and therefore, any differences between the initial base file (i.e., baseFile1) and subsequent base file (i.e., baseFile2) are no longer present. This results in a clean diff of the subsequent iterations (e.g., iteration1 against iteration2), only showing the changes that the author made in the second iteration without showing the changes that were inherited from the "sync" when they updated to the updated base file (i.e., baseFile2).

Moreover, some embodiments allow the code reviewer to identify how the author of the code "merged" their changes with an updated baseline (e.g., baseline2) in the event that the author of the code made changes in the same portion of the code that updated baseline (e.g., baseline2) had changes. This feature allows the reviewer to confirm that the author correctly merged their changes with the conflicting changes that came from the updated baseline (without this technology, this visibility can be lost).

Various embodiments of the present technology provide for a wide range of technical effects, advantages, and/or improvements to computing systems and components. For example, various embodiments include one or more of the following technical effects, advantages, and/or improvements: 1) reducing the number of user interactions when creating diff of code iterations; 2) automatically identifying and suppressing changes made by other code developers that are present in the successive iterations; 3) creates a new format for tracking and storing data related to code versions; 4) creates improvements to the way computing devices operate; 5) uses unconventional and non-routine operations as part of the diffing process to automatically suppress changes made by other code developers; 6) uses additional graphical user interfaces for reviewing code; 7) indicate simultaneously edited portions of merged files so reviews can ensure needed changes weren't lost or overwritten; and/or 8) changes the manner in which a computing system reacts, processes and manages code review between multiple developers. Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a code review tool with enhanced diffing technology, embodiments of the present technology are equally applicable to various other instantiations where multiple individuals are editing common documents. Moreover, while some embodiment provides for a code review platform such implementations are not needed in every embodiment. Some embodiments just use decentralized code review tools that are not connected to a code review platform.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 10:
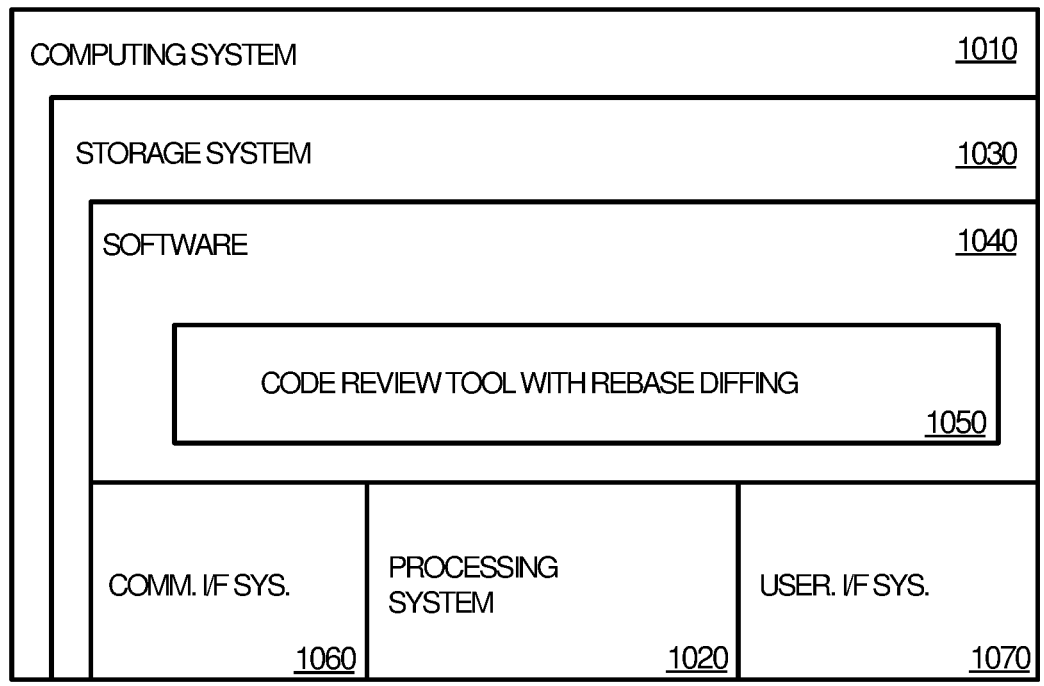
FIG. 10 illustrates an example of a computing system, which is representative of any system or collection of systems in which the various applications, services, scenarios, and processes disclosed herein may be implemented.

FIG. 1 illustrates an example of an environment capable of implementing a code review tool with rebase diffing in accordance with some embodiments of the present technology. As illustrated in FIG. 1, environment 100 may include one or more computing devices 110A-110N, communications network 120, remote servers running code review platform 130, and central repository 140. Computing devices 110A-110N can be any computing system capable of running an application natively or in the context of a web browser, streaming an application, or executing an application in any other manner Examples of computing system 110 include, but are not limited to, personal computers, mobile phones, tablet computers, desktop computers, laptop computers, wearable computing devices, thin client computing devices, virtual and/or augmented reality computing devices, virtual machine hosting a computing environment, distributed application, server computer, computing cluster, application hosted as software as a service (SaaS), application running on a platform as a service (PaaS), application running on an infrastructure as a service (IaaS) or any other form factor, including any combination of computers or variations thereof. One such representative architecture is illustrated in FIG. 10 with respect to computing system 1010.

Those skilled in the art will appreciate that various components (not shown) may be included in computing devices 110A-110N to enable network communication with communications network 120. In some cases, communications network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Code review platform 130 can allow material (e.g., files, text, code, objects, etc.) stored on central repository 140 to be accessed by computing devices 110A-110N. In some embodiments, code review platform 130 can receive a request to open a document 150 on a first computing device via communications network 120. Code review platform 130 can verify the identity of the requestor and allow or deny access to the document. Once the document is opened, the user will be able to edit the file. Once the user has finished with the first round of edits, the user can submit the file to a reviewer to provide comments. In some embodiments, code review platform 130 receives this notification and notifies the reviewer to review the code and provide feedback.

The reviewer can provide comments for the developer which may include changes to the code or file. The developer can then make the updates based on the comments from the reviewer and send out an updated file for review. In some cases, the developer may integrate their changes with the latest base file stored on central repository 140. As a result, the file may include changes that were made by other developers. However, since the reviewer who has already reviewed the first iteration of the changes from the developer may only want to see the updated changes since the first iteration. Instead of comparing the second iteration to the current base file, the differencing tool within the code review platform can compare the second and first iteration (i.e., iteration2 against iteration1) while suppressing changes made by other developers that were included when the developer updated to the latest base file.

Code review platform 130 can keep track of and manage the review process and different versions or iterations of file 150 using central repository 140. For example, in some embodiments, code review platform 130 can store iterations or versions of source code sent for review from developers while maintaining a base file representing most recent code or file that has been approved. In accordance with various embodiments, code review platform 130 can keep track of the changes made between versions of the base file by different developers. Then, as part of the diffing process, code review platform can only identify changes may be the developer. In other embodiments, code review platform 130 can perform a virtual merge of the changes from iteration one against the updated base file such that the first iteration is "rebased" against the second baseline.

As a result, when code review platform 130 creates a diff of subsequent iterations (e.g., iteration1 against iteration2), both files in the diffing tool now behave as if they were against the same baseline, and therefore, any differences between the initial base file (i.e., baseFile1) and subsequent base file (i.e., baseFile2) are no longer present. This results in a clean diff of the subsequent iterations (e.g., iteration1 against iteration2), only showing the changes that the author made in the second iteration without showing the changes that were inherited from the "sync" when they updated to the updated base file (i.e., baseFile2).

Figure 2:
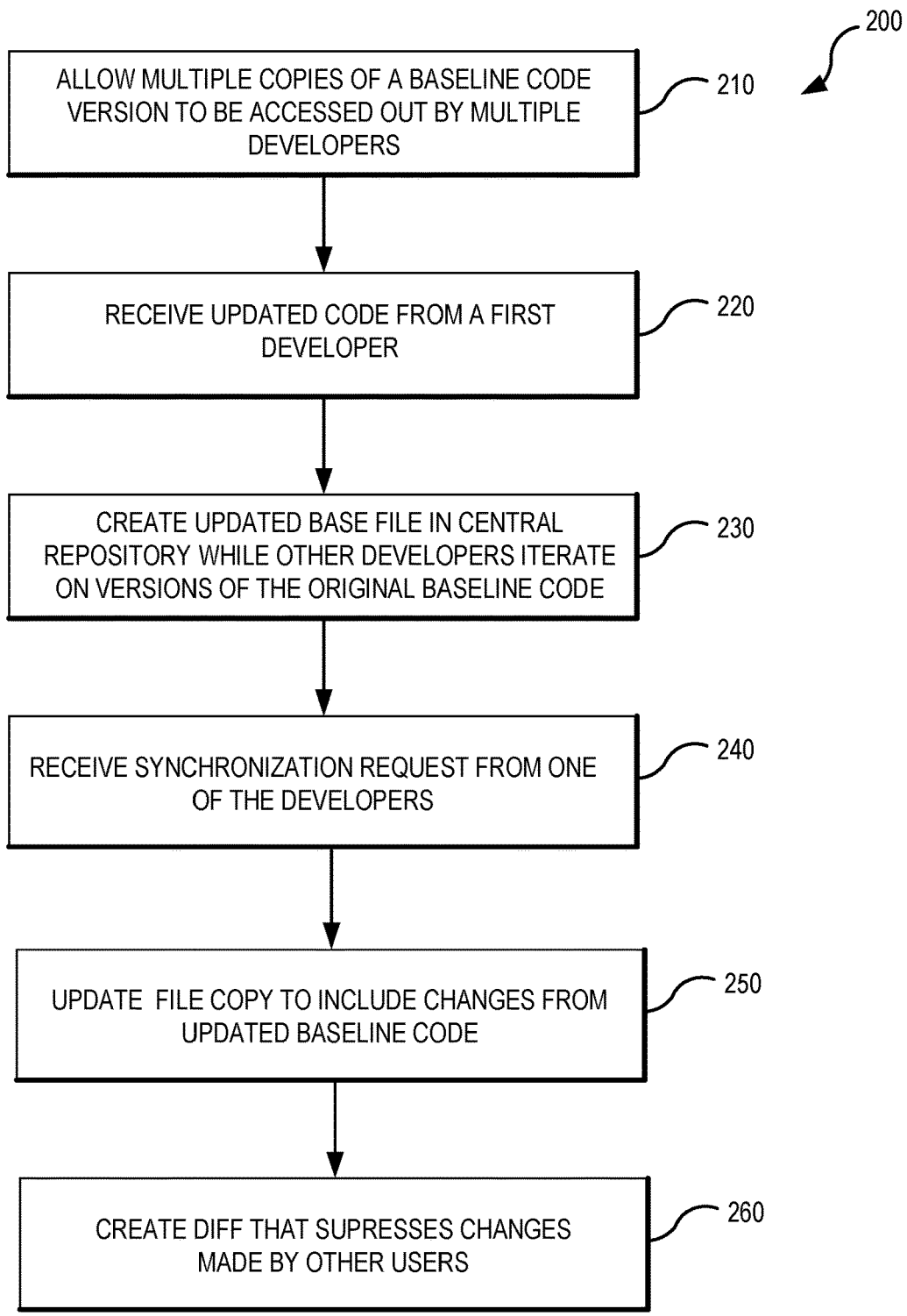
FIG. 2 illustrates an example of a set of operations for operating a code review tool according to one or more embodiments of the present technology.

FIG. 2 illustrates an example of a set of operations 200 for operating a code review tool according to one or more embodiments of the present technology. As illustrated in FIG. 2, copy operation 210 allows developers to access a copy of the current baseline code on client devices. The developers can then individually edit the copies of the current baseline code. During receiving operation 220, one of the developers can submit an updated baseline code which update operation 230 uses to update the baseline code in a central repository. This may, in some embodiments, create a notification to the other developers via a code review tool. The notification can provide a visual indicator that the baseline code has been updated. One or more of the other developers may submit synchronization requests that are received during receiving operation 240.

In response, synchronization operation 250 updates the file checked out by the developer to include changes from the updated baseline file. Then, the developer makes additional changes to their copy of the code. These changes may be, for example, in response to comments from one or more reviewers. When the developer resubmits the code for review, creation operation 260 can create a diff suppressing changes that were incorporated as part of update operation 250. In some embodiments, instead of suppressing the changes from update operation 250, the diff may provide different visual indicators facilitating a quick review. For example, the different visual indicators may include font color, font size, line coloring, use of markers, and the like.

Various embodiments of the present technology may store and track the base file with the iterated versions together. In other embodiments, the base file may not be stored together with the changes. For example, the base file may be stored in a central repository or cloud based storage system while the changes may be present on a client device. Some embodiments can use pointer technology to identify the changes and/or files. For example, the base file may be a pointer to a base file already represented in an internal change management software. Change management software may also store one or more intermediate copies. As such, some embodiments can take a snapshot from the change management software and pack the changes together with the new files (e.g., those only exist in the developer device).

Figure 3:
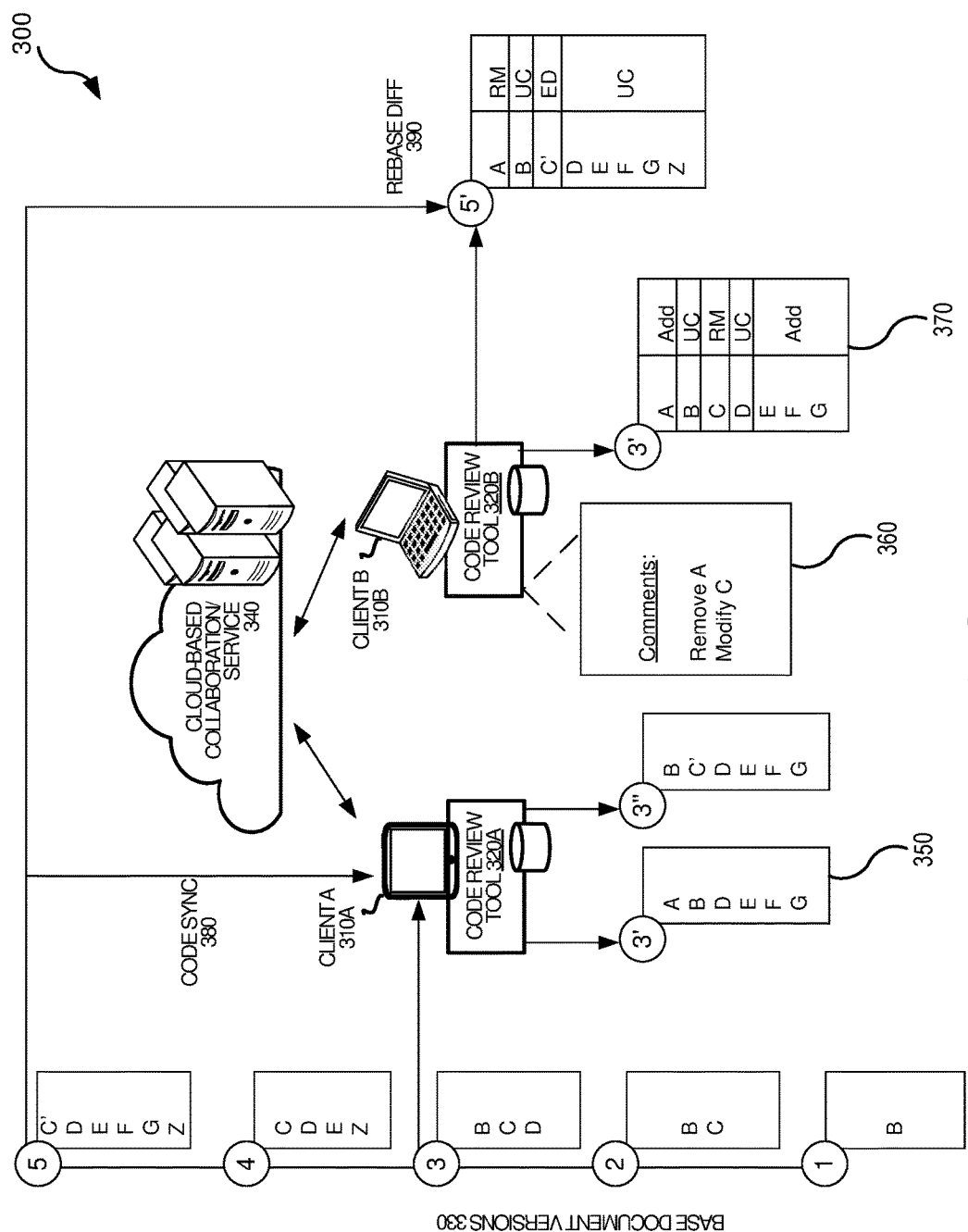
FIG. 3 illustrate a set of components associated with a cloud-based collaboration service supporting enhanced review functionality that may be used in one or more embodiments of the present technology.

FIG. 3 illustrate a set of components 300 associated with a cloud-based collaboration service supporting enhanced review functionality that may be used in one or more embodiments of the present technology. As illustrated in FIG. 3, first client device 310A runs application 320A that can access baseline document 330 from service 340. Collaboration service 340 may be a share drive or service capable of storing any form of electronic data that can be opened on a client device. For example, collaboration service 340 may provide shared access to cloud-based or centralized content and centralized storage for workbooks such as, for example, Microsoft® Office 365, Microsoft® SharePoint® Online (SPO) services, SharePoint®, a shared network drive, or the like. In accordance with various embodiments, application 320A may be part of an integrated development environment (IDE), customized code review tool, office productivity applications such as, but not limited to, e-mail applications, word processing applications, note taking applications, spreadsheet applications, and the like.

In some embodiments, the collaboration service can also be embedded in client devices 310A and 310B and may be communicatively coupled using a network connection (e.g., Wi-Fi, Ethernet, Bluetooth, 3G, 4G, 5G, LTE etc.) or operate as a cloud based service. The collaboration service can include services like file sharing, messaging, with users logged into the service with an account and various contact methods such as phone, text, email, and various messaging application and social network profiles with contact information.

As shown in the example of FIG. 3, the third baseline document 330 (i.e., document 3 illustrated in FIG. 3) can be opened on client device 310A with application 320A. Application 320A can include functionality including GUIs (graphical user interface) running on client device 310A, e.g., a PC, mobile phone device, a Web server, or other application servers. Such systems may employ one or more virtual machines, containers, or any other type of virtual computing resource. As illustrated in FIG. 3, multiple versions of a baseline document 330 can be stored over time. Suppose the third document is the current baseline document 330 when opened by a user. The user can edit the third baseline document to create an edited document 350 (i.e., document 3' as shown in FIG. 3) of the third baseline document 330 using standard editing techniques (keystrokes, mouse inputs, touch inputs, voice commands including interacting with artificial intelligence service such as Microsoft's Cortana Assistant, combination of aforementioned, etc.).

Edited document 350 may be stored in a local memory or a document repository associated. In some embodiments, edited document 350 may be transmitted to cloud-based collaboration service 340. In some embodiments, a reference, link, or Universal Resource Identifier (URI) that points to the edited document 350 in the application 320A can be stored and associated with client device 310A using a variant of the aforementioned cloud based collaboration service 340 or shared directly with client device 310B or code review application 320B leveraging network connections like Bluetooth, WIFI, 4G, 5G, LTE, caching on portable storage, and the like.

The transmission to collaboration service 340 may include additional information and/or metadata in addition to edited document 350. This additional information and/or metadata can include, but is not limited to information identifying baseline document 330, the user, client device 310, code review application 320A, changes made to the document and/or other information. Edited document 350 along with the additional information or metadata can be stored in a variety of formats. This additional information or metadata may be presented to the user of code review tool 320B as optional information or used by a diffing tool associated with code review tool 320B.

When the reviewer logs into collaboration service 340 via client device 310B, client device 310B may access edited document 350 copied from client device 310A. Client device 310B may directly access edited document 350 within collaboration service 340 or have a copy loaded into a local clipboard, memory, or buffer on client device 310B. The user can then request (e.g., using menu or other command interface) that edited document 350 be stored into a new location on client device 310B. Code review tool 320 can provide a diffing option 370 that allows the reviewer to easily identify the changes (e.g., additions, removals, no change, etc.) made to the code.

The reviewer can provide comments 360 via code review tool 320B. As illustrated in FIG. 3, the reviewer has requested that the developer remove A and modify C. In the meantime, other developers have edited the baseline document and created new version. The developer synchronizes the code 350 and makes the changes suggested by the reviewer creating iteration 3". However, since some of the changes were made by other developers and incorporated as part of synchronization process 380, the reviewer would like a view within code review tool 320B that shows only changes made by the developer and not those changes created by synchronization 380. As a result, the code review tool 320B can create a rebased diff 390 that only indicates the changes made by the developer and not that the changes resulting from synchronization 380.

Figure 4:
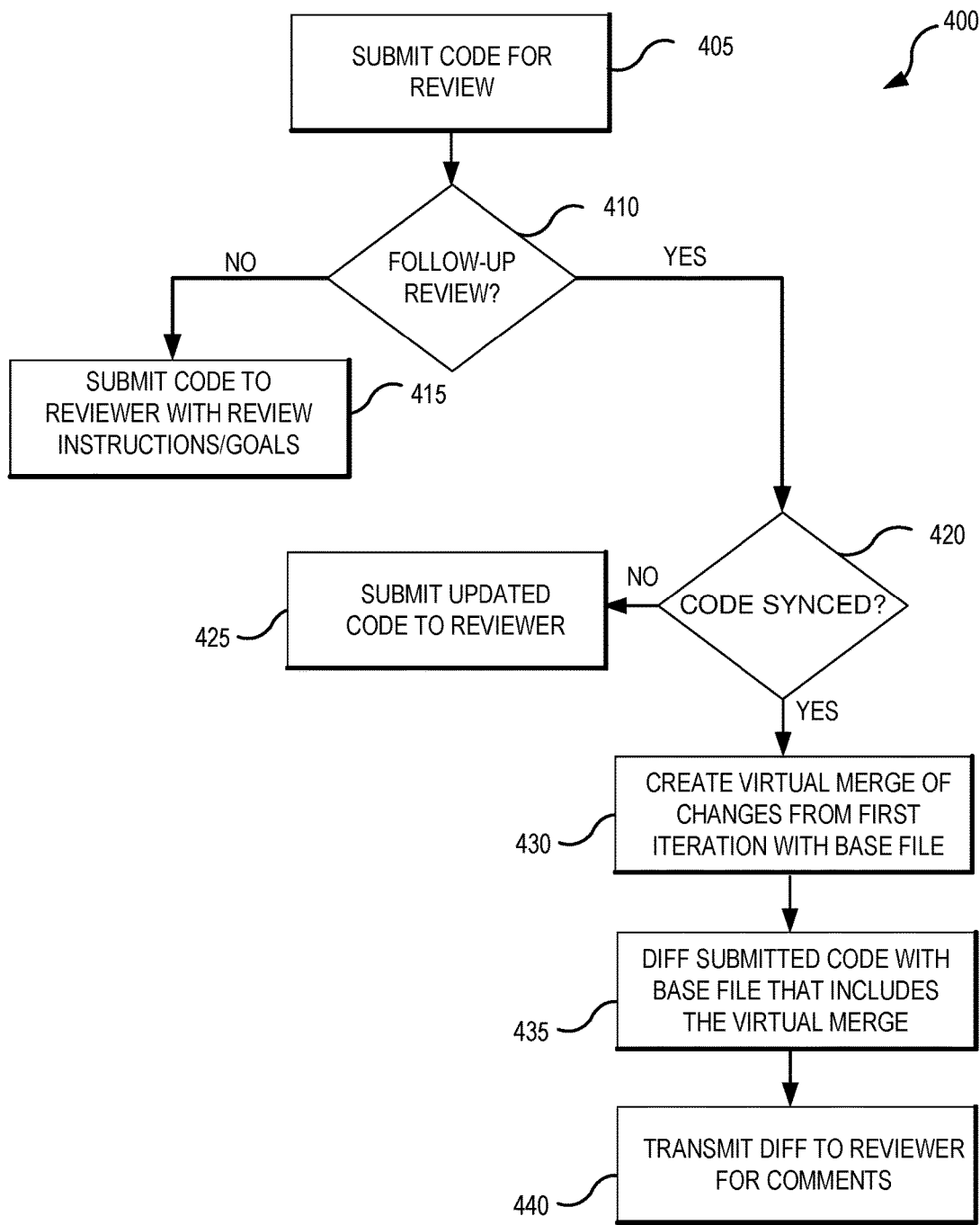
FIG. 4 illustrates an example of a set of operations for rebase diffing according to one or more embodiments of the present technology.

FIG. 4 illustrates an example of a set of operations for rebase diffing according to one or more embodiments of the present technology. As illustrated in FIG. 4, submission operation 405 receives an indication that modified code (or document) is ready for review. Determination operation 410 determines whether the submission is a follow-up review where the developer has addressed specific reviewer comments or is a new submission. When determination operation 410 determines that the submission is a new submission the code is submitted to a reviewer using initial review operation 415. When determination operation 410 determines that the submission is a modification of code (or document) based on reviewer feedback, then determination operation 410 branches to synchronization operation 420 where a determination is made as to whether the code (or document) has been synchronized with a new baseline document (e.g., from a central repository) to include changes from other developers in addition to the changes specifically addressing the reviewer's comments.

When synchronization operation 420 determines that the code has not been synchronized with an updated baseline document, synchronization operation 420 branches to updated submission operation 425. During updated submission operation 425, the revised code can be resubmitted to the reviewer (or a new reviewer). As part of updated submission operation 425, a redline, markup, or diff can be created between the current iteration and the previous version submitted to the reviewer. In addition, the previous comments provided by the reviewer may also be presented. When synchronization operation 420 determines that the code has been synchronized with an updated baseline document, synchronization operation 420 branches to merging operation 430 where a virtual merge of the changes from the first iteration and the updated baseline file is created. Diffing operation 435 creates a markup or diff of the submitted code with the base file that includes the virtual merge. As a result, the diff suppresses or hides any changes that were not made by the current developer in response to the reviewer's original comments. Presentation operation 440 then presents the diff to the reviewer.

Figure 5:
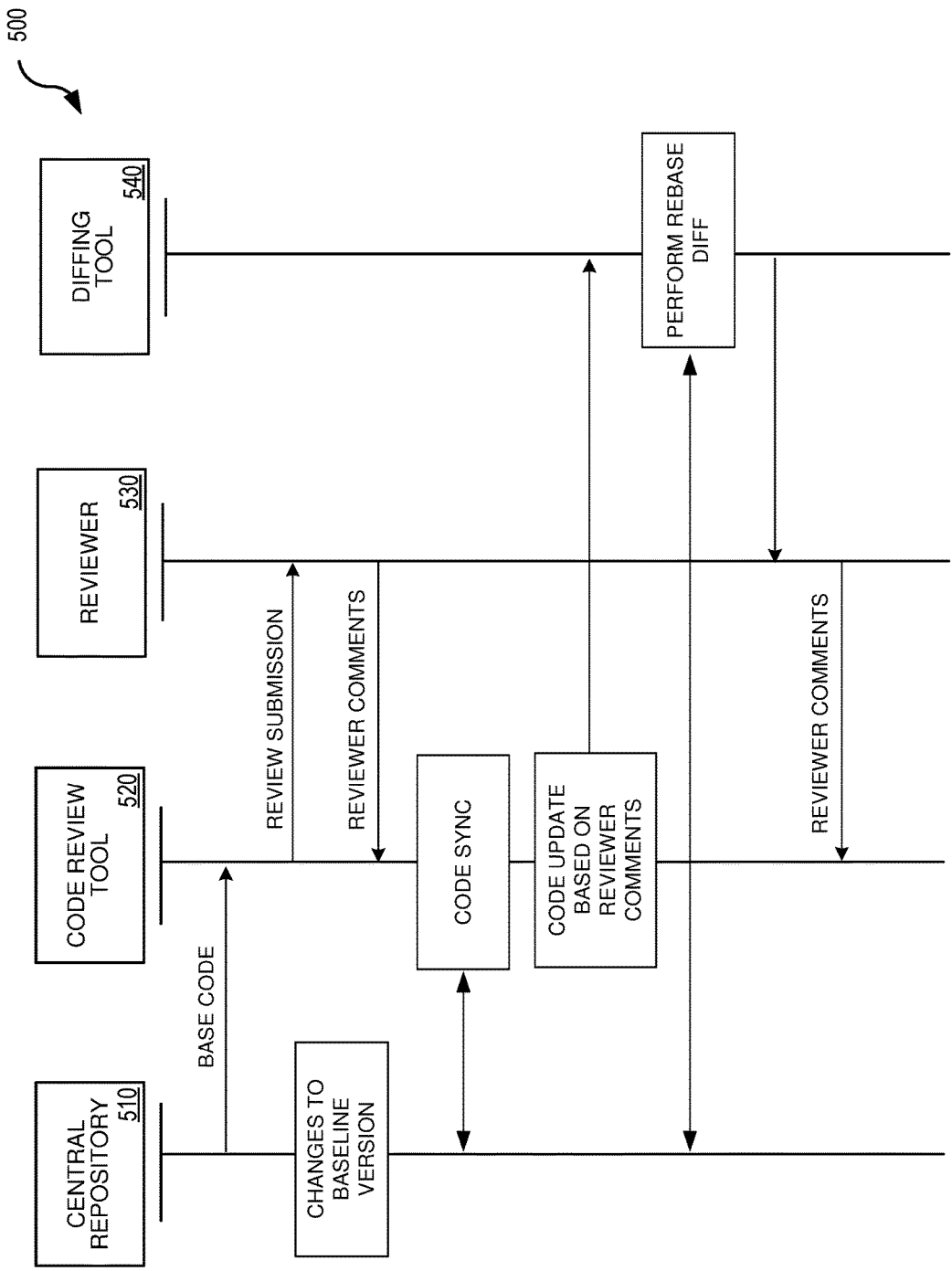
FIG. 5 is a sequence diagram illustrating an example of the data flow between various components of a code review tool in accordance with some embodiments of the present technology.

FIG. 5 is a sequence diagram 500 illustrating an example of the data flow between various components of a code review tool in accordance with some embodiments of the present technology. As illustrated in FIG. 5, base code stored in the central repository 510 is accessed by a developer via a code review tool 520. The developer can edit the code and submit the updated code to reviewer 530. The reviewer can provide feedback to the developer on desired changes to the edited code. The developer can perform a code sync to incorporate changes made from other developers as the base file has been updated. Then, using code review tool 520, the developer can create a second iteration based on the reviewer's comments. The second iteration can be submitted to diffing tool 540 which can identify changes (e.g., addition, deletions, portions of code moved, etc.) new changes to the code. However, since the developer synchronized the code file with the latest baseline version from central repository 510, diffing tool 540 can identify changes made by others and suppress those changes. For example, in some embodiments, diffing tool 540 can perform a virtual merge of the baseline file with the previous iteration before creating the diff. As a result, the diff will only show the changes made by the developer.

Figure 6:
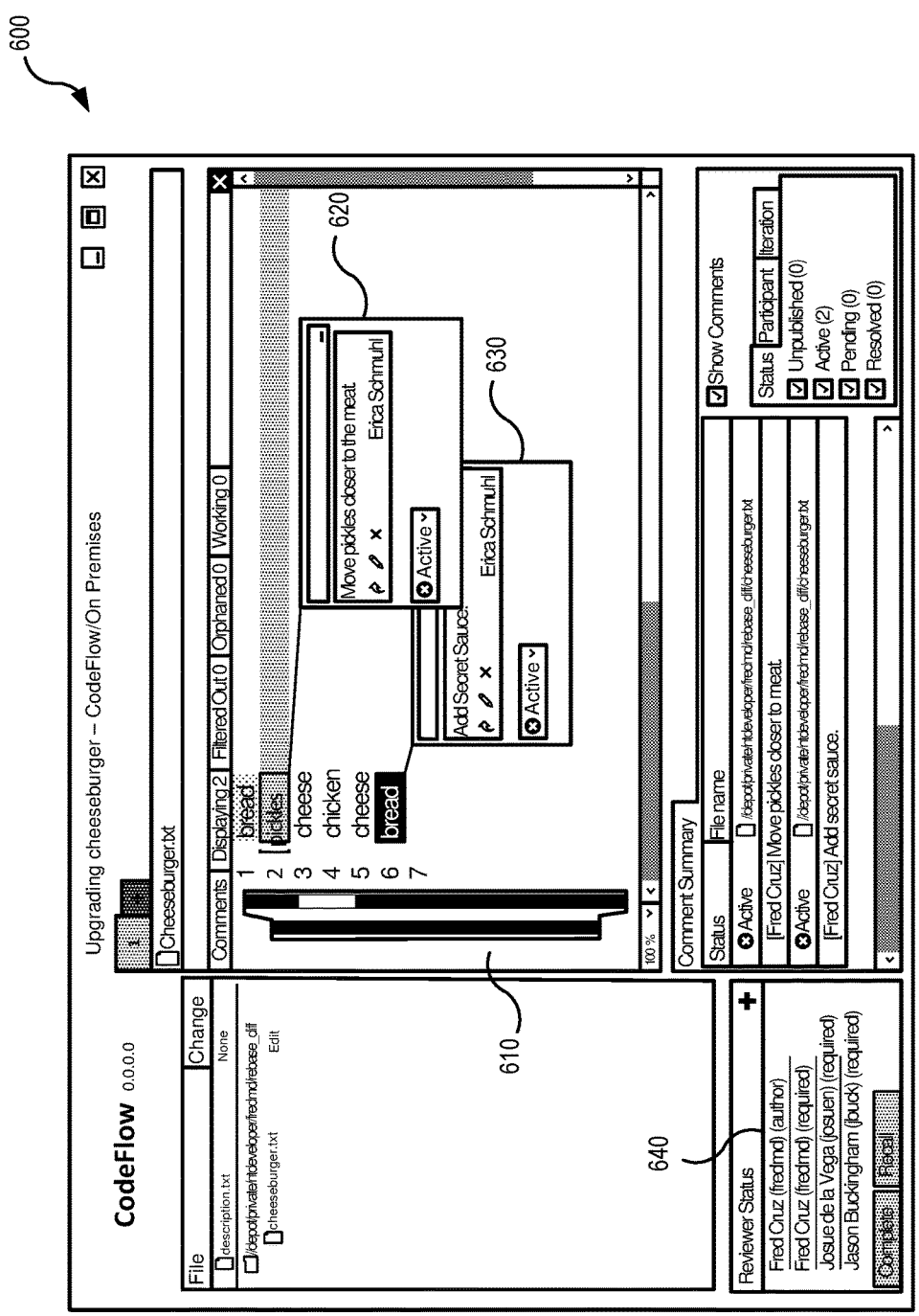
FIG. 6 illustrates an example of a code review tool supporting diffing rebase according to various embodiments of the present technology.

FIGS. 6-9 illustrate examples of a code review tool supporting diffing rebase according to various embodiments of the present technology. As illustrated in FIG. 6, the developer has access a file called cheeseburger.txt presented in editing window 610. The developer has been tasked with modifying the code to fix the bug "add pickles and secret sauce." The developer makes the change and sends out the first iteration of the code review. Status window 640 shows which reviewers have reviewed the code. The code reviewers add some comments 620 and 630 that the developer is going to address and send out in the second iteration.

Figure 7:
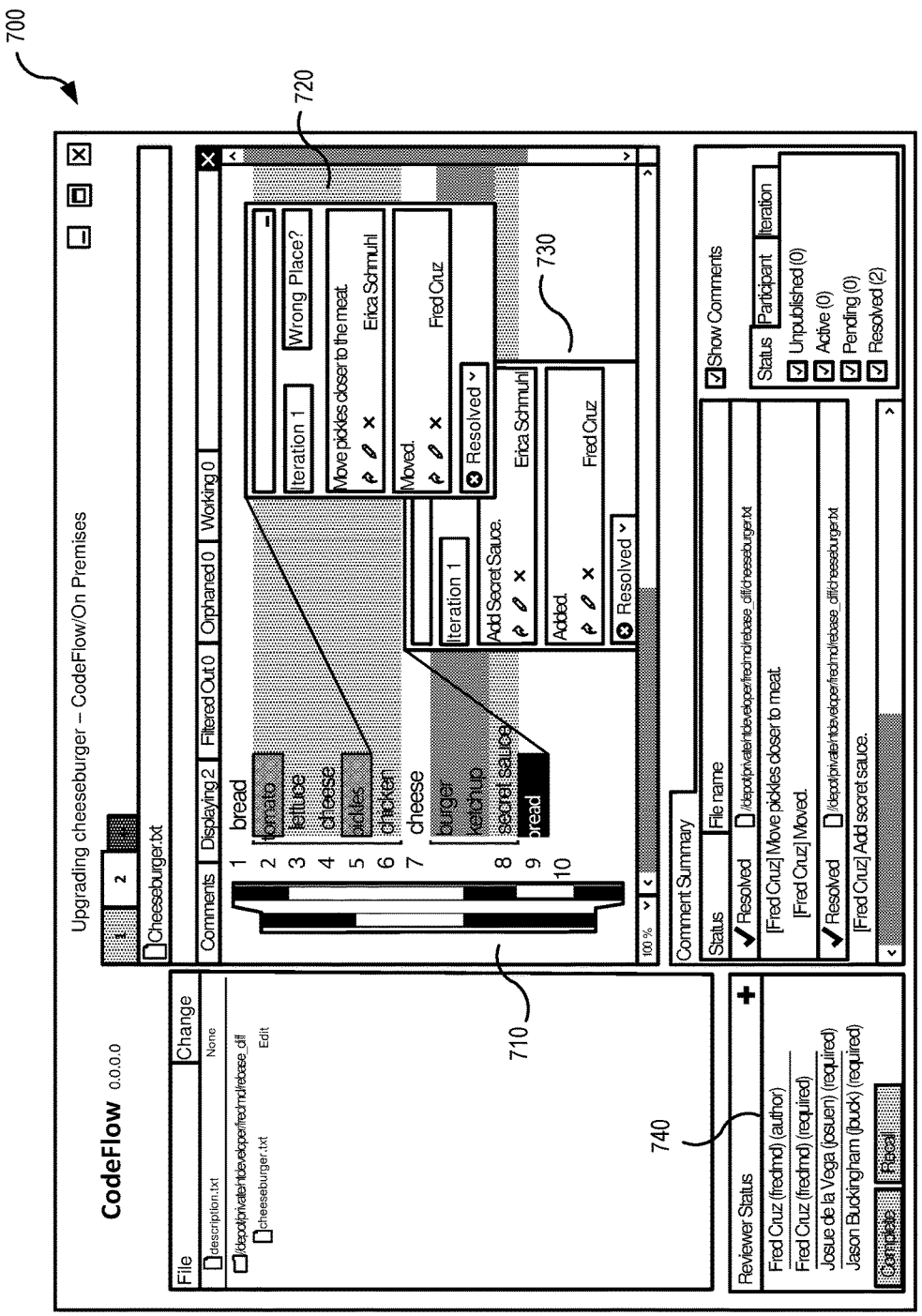
FIG. 7 illustrates an example of a code review tool supporting diffing rebase according to various embodiments of the present technology.

Meanwhile, as illustrated in FIG. 7, someone else modifies the cheeseburger.txt file and the developer has to catch up with those changes prior to sending out the second iteration. By looking only at the second iteration the reviewers can be confused, because there should only be two changes addressing the two comments: pickles should be on top of meat and secret sauce on top of bread. However, there are many other changes (e.g., additions and removals) showing up. In some embodiments, the changes may be color coded (e.g., addition may be indicated as yellow and deletions may be indicated as red). That happens because the second iteration has been compared with a different code baseline.

Figure 8:
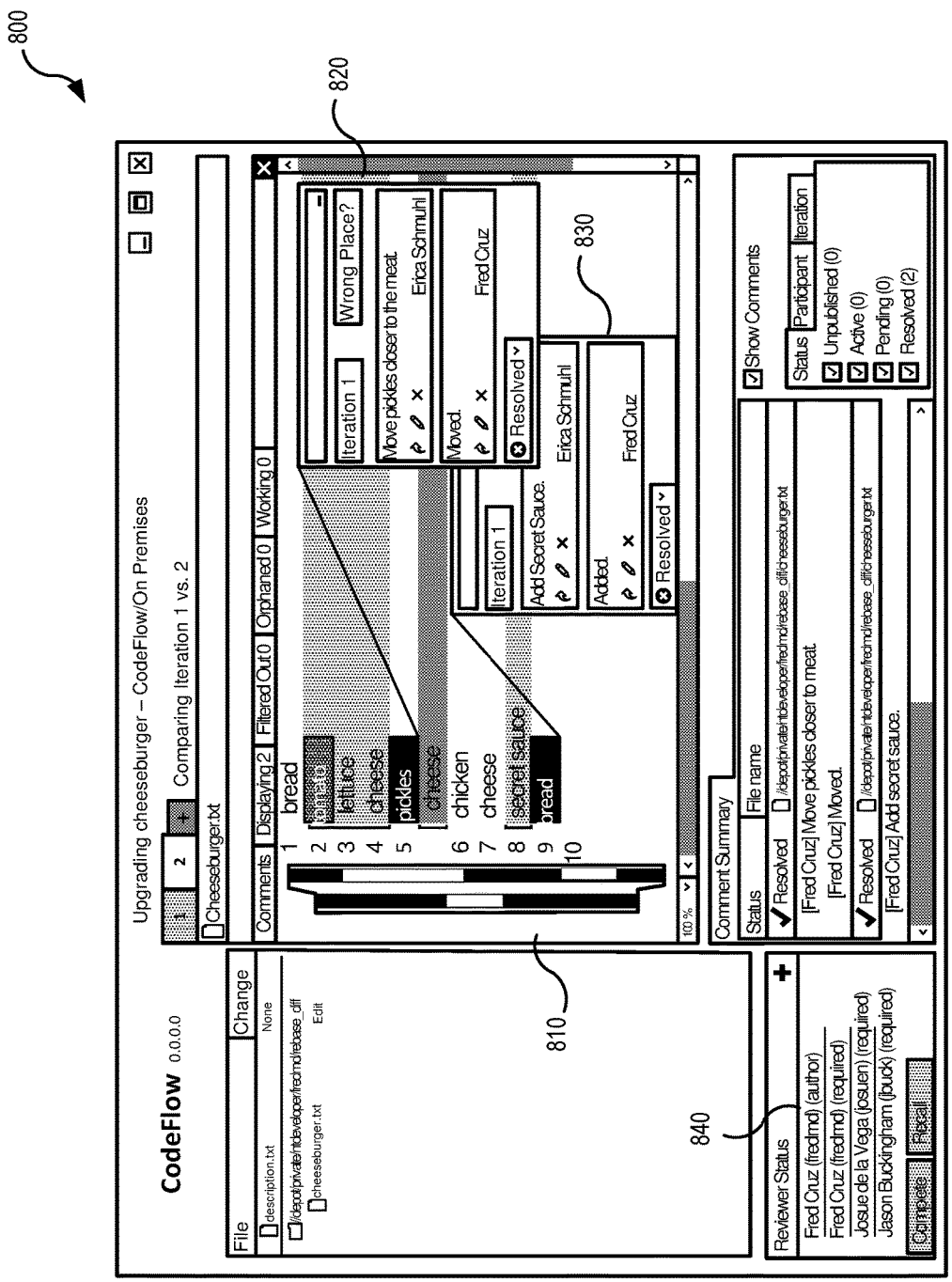
FIG. 8 illustrates an example of a code review tool supporting diffing rebase according to various embodiments of the present technology.

Some embodiments of the code review tool provide a second view that ignores changes to the baseline by only calculating or identifying the difference between iterations (e.g., iteration 1 and iteration 2) as illustrated in FIG. 8. As a result, the reviewers can see that pickles were moved to the top of meat (the diff algorithm chose to show cheese move on top of pickles, but that's ok) and that secret sauce was added on top of bread. However, this view can cause additional work for the review because tomato and lettuce have been added and the reviewer may be uncertain whether that was added by the developer or by someone else. Additional work may also be created when the reviewer only looks at the second iteration, the reviewers see that the burger has been replaced with chicken, but if they look at the first iteration versus the second iteration, they only see chicken.

Figure 9:
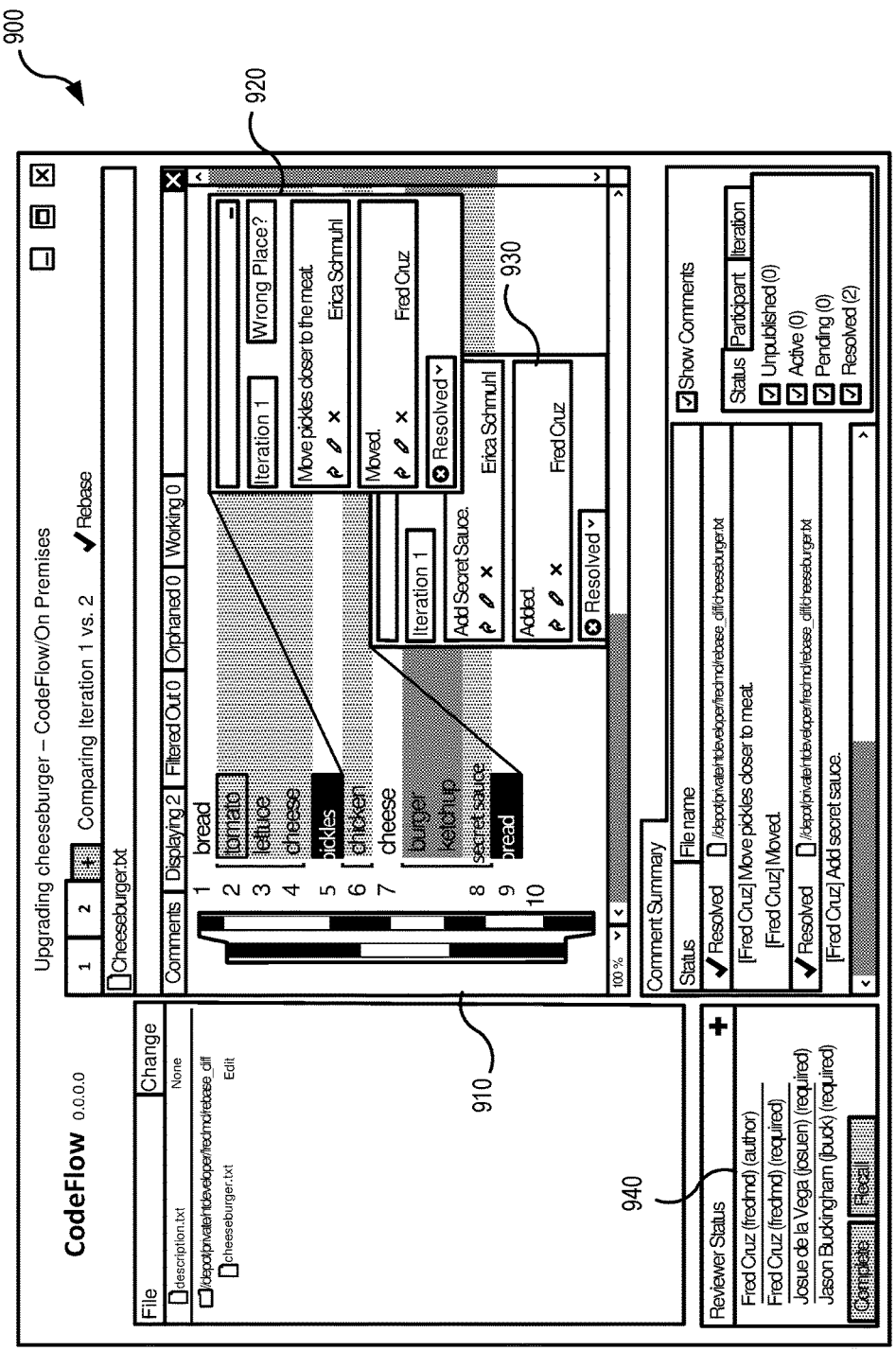
FIG. 9 illustrates an example of a code review tool supporting diffing rebase according to various embodiments of the present technology.

By activating the rebase diff feature, everything finally becomes clear to the reviewer. Using the rebase diff feature, reviewer can easily identify that lettuce and tomato were introduced by the developer while they should not be part of "add pickles and secret sauce" change. In addition, the developer made a mistake when resolving conflicts after rebasing the second iteration. What happened is that the developer reverted someone else's change that replaced chicken with burger. Without rebase diff, the revert would go unnoticed. In addition, as illustrated in FIG. 9, the first comment 920 was addressed correctly and pickles was moved next to the meat and the second comment 930 was addressed correctly as secret sauce was added to the bread.

FIG. 10 illustrates computing system 1010, which is representative of any system or collection of systems in which the various applications, services, scenarios, and processes disclosed herein may be implemented. For example, computing system 1010 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 1010 may be implemented as a single apparatus, system, or device or may be implemented in a distributed manner as multiple apparatuses, systems, or devices. Computing system 1010 includes, but is not limited to, processing system 1020, storage system 1030, software 1040, applications for process 1050, communication interface system 1060, and user interface system 1070. Processing system 1020 is operatively coupled with storage system 1030, communication interface system 1060, and an optional user interface system 1070.

Processing system 1020 loads and executes software 1040 from storage system 1030. When executed by processing system 1020 for deployment of scope-based certificates in multi-tenant cloud-based content and collaboration environments, software 1040 directs processing system 1020 to operate as described herein for at least the various processes, operational scenarios, and sequences discussed in the foregoing implementations. Computing system 1010 may optionally include additional devices, features, or functionality not discussed for purposes of brevity.

Referring still to FIG. 10, processing system 1020 may comprise a micro-processor and other circuitry that retrieves and executes software 1040 from storage system 1030. Processing system 1020 may be implemented within a single processing device, but may also be distributed across multiple processing devices or sub-systems that cooperate in executing program instructions. Examples of processing system 1020 include general purpose central processing units, application specific processors, and logic devices, as well as any other type of processing device, combinations, or variations thereof.

Storage system 1030 may comprise any computer readable storage media readable by processing system 1020 and capable of storing software 1040. Storage system 1030 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1030 may also include computer readable communication media over which at least some of software 1040 may be communicated internally or externally. Storage system 1030 may be implemented as a single storage device, but may also be implemented across multiple storage devices or sub-systems co-located or distributed relative to each other. Storage system 1030 may comprise additional elements, such as a controller, capable of communicating with processing system 1020 or possibly other systems.

Software 1040 may be implemented in program instructions and among other functions may, when executed by processing system 1020, direct processing system 1020 to operate as described with respect to the various operational scenarios, sequences, and processes illustrated herein. For example, software 1040 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 1040 may include additional processes, programs, or components, such as operating system software, virtual machine software, or application software. Software 1040 may also comprise firmware or some other form of machine-readable processing instructions executable by processing system 1020.

In general, software 1040 may, when loaded into processing system 1020 and executed, transform a suitable apparatus, system, or device (of which computing system 1010 is representative) overall from a general-purpose computing system into a special-purpose computing system. Indeed, encoding software on storage system 1030 may transform the physical structure of storage system 1030. The specific transformation of the physical structure may depend on various factors in different implementations of this description. Examples of such factors may include, but are not limited to, the technology used to implement the storage media of storage system 1030 and whether the computer-storage media are characterized as primary or secondary storage, as well as other factors.

For example, if the computer readable storage media are implemented as semiconductor-based memory, software 1040 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

In general, process 1050 can be hosted in the cloud as a service, distributed across computing devices between the various endpoints, hosted as a feature of a cloud enabled information creation and editing solution. Communication interface system 1060 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1070 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1070. In some cases, the input and output devices may be combined in a single device, such as a display capable of displaying images and receiving touch gestures. The aforementioned user input and output devices are well known in the art and need not be discussed at length here. In some cases, the user interface system 1070 may be omitted when the computing system 1010 is implemented as one or more server computers such as, for example, blade servers, rack servers, or any other type of computing server system (or collection thereof).

User interface system 1070 may also include associated user interface software executable by processing system 1020 in support of the various user input and output devices discussed above. Separately or in conjunction with each other and other hardware and software elements, the user interface software and user interface devices may support a graphical user interface, a natural user interface, an artificial intelligence agent capable of assisting with automation of the code review operations (e.g. an enhanced version of Microsoft's Cortana assistant, Amazon's Alexa, or Apple's Siri, Google's Assistant, etc.), or any other type of user interface, in which a user interface to a productivity application may be presented.

Communication between computing system 1010 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A code review platform comprising:
   one or more processors;
   a central repository storing a first baseline version of a file;
   a communication component to:
      connect the code review platform to a first client device and a second client device, wherein each client device is running a code review tool capable of accessing the first baseline version of the file;
      receive a first set of edits to the first baseline version of the file made via the code review tool on the first client device; and
      store in the central repository a second baseline version of the file that includes a second set of edits provided via the code review tool on the second client device; and
   a review management module to:
      monitor review of the first and second sets of edits to the first baseline version of the file, wherein the communication component transmits comments from the review of the first and second sets of edits to the first baseline version of the file to a developer, and wherein subsequent edits to the first baseline version of the file are rebased in response to a synchronization against the second baseline file to identify the subsequent edits while not showing the second set of edits as changes.

2. The code review platform of claim 1, wherein each code review tool includes a graphical user interface that presents comments created during the review of the first and second sets of edits of the first baseline version of the file and allows a reviewer to select between multiple diff versions.

3. The code review platform of claim 2, wherein the multiple diff versions include a rebased version that identifies changes made by the developer while suppressing the second set of edits present in the second baseline version.

4. The code review platform of claim 1, further comprising a diffing tool to create a diff of a rebased version of the first and second sets of edits to the first baseline version and successive changes made in the subsequent iterations of the file.

5. The code review platform of claim 1, wherein the review management module tracks comments made by reviewers through subsequent iterations of the file.

6. A non-transitory computer-readable medium having instructions stored thereon that when executed by one or more processors cause a machine to:
   allow a first copy and a second copy of a source document to be simultaneously edited by client devices;
   submit a first iteration of the first copy that includes one or more changes to a reviewer;
   create, in response to one of the client devices checking in an edited version of the second copy of the source document, a new version of the source document;
   synchronize the first copy of the source document to include changes made in the new version of the source document;
   create a second iteration of the first copy addressing comments made by the reviewer;
   rebase the first iteration with the new version of the source document; and
   create a diff of the second iteration and the rebase of the first iteration with the new version of the source document suppressing any changes made within the second copy.

7. The non-transitory computer-readable medium of claim 6, further comprising instructions that when executed by the one or more processors further cause the machine to:
   suppress changes made in the new version of the source document.

8. The non-transitory computer-readable medium of claim 6, wherein the instructions when executed by the one or more processors cause the machine to:
   use color coding to allow the reviewer to identify changes originating from synchronization of the first copy with the new version of the source document.

9. The non-transitory computer-readable medium of claim 6, wherein the instructions when executed by the one or more processors cause the machine to:
   create a data structure identifying changes made to the first copy or the second copy with users and wherein the diff uses the data structure to identify changes made by the users.

10. The non-transitory computer-readable medium of claim 6, wherein the instructions when executed by the one or more processors cause the machine to:
    rebase the first iteration with the new version of the source document by using a virtual merge of the first iteration with the new version of the source document.

11. The non-transitory computer-readable medium of claim 6, wherein the diff of the second iteration and the rebase of the first iteration identify changes introduced by synchronization with the new version of the source document in a first format different than a second format identifying changes made in the second iteration addressing comments made by the reviewer.

12. The non-transitory computer-readable medium of claim 6, wherein the instructions when executed by the one or more processors cause the machine to:
    create a third version of the source document in response to approval from the reviewer.

13. A method for operating a code review tool, the method comprising:
    receiving a request for an edited document to be reviewed;
    determining whether the edited document includes additional edits in a second iteration of the edited document in response to reviewer comments of a first iteration of the edited document;
    identifying, in response to determining that the edited document includes the additional edits in response to the reviewer comments, whether the edited document was updated via a synchronization with a base file in a local repository; and
    creating a diff of the second iteration with the first iteration that suppresses any changes introduced as a result of the synchronization.

14. The method of claim 13, wherein creating the diff includes creating a virtual merge of changes from the first iteration with the base file and the method further includes presenting reviewer comments along with the diff via a graphical user interface.

15. The method of claim 13, further comprising:
    determining whether the edited document includes edits to a portion of the base file edited by a user other than the reviewer; and
    highlighting any commonly edited portions between the base file and the edited document.

16. The method of claim 13, wherein the diff includes multiple presentations, wherein at least one of the presentations allows the reviewer to identify changes introduced by the synchronization with the base file in a first format that is different than a second format representing the additional edits made in response to the reviewer comments.

17. The method of claim 13, further comprising creating a rebased iteration that incorporates a virtual merge of the first iteration with the base file.

18. The method of claim 17, further comprising:
    receiving, from the reviewer, an approval of the second iteration; and
    creating, in response to receiving the approval, a new base file in the local repository based on the second iteration.

19. The method of claim 18, further comprising:
    receiving additional comments from the reviewer; and
    presenting the additional comments to a developer to create a third iteration with changes addressing the additional comments.

20. The method of claim 13, further comprising associating edits with developers and creating the diff includes using different visual markers to identify changes by the developers.

* * * * *